United States Patent
Schuelke (10) Patent No.: US 9,199,807 B1
(45) Date of Patent: Dec. 1, 2015

(54) BIN SWEEP WITH DRIVE SLIPPAGE CAPABILITY

(71) Applicant: Brian Schuelke, Lennox, SD (US)

(72) Inventor: Brian Schuelke, Lennox, SD (US)

(73) Assignee: Sioux Steel Company, Sioux Falls, SD (US)

( * ) Notice: Subject to any disclaimer, the term of this patent is extended or adjusted under 35 U.S.C. 154(b) by 0 days.

(21) Appl. No.: 14/107,246

(22) Filed: Dec. 16, 2013

Related U.S. Application Data (60) Provisional application No. 61/737,373, filed on Dec. 14, 2012.

(51) Int. Cl.
| | |
|---|---|
| *B65G 65/00* | (2006.01) |
| *B65G 65/40* | (2006.01) |
| *B65G 65/42* | (2006.01) |
| *A01F 25/20* | (2006.01) |

(52) U.S. Cl.
CPC ............. *B65G 65/40* (2013.01); *B65G 65/425* (2013.01); *A01F 25/2018* (2013.01)

(58) Field of Classification Search
CPC .... B65G 65/466; B65G 65/22; B65G 65/425; A01F 25/2018
USPC .......................................... 414/306, 307, 310
See application file for complete search history.

(56) References Cited

U.S. PATENT DOCUMENTS

| | | | |
|---|---|---|---|
| 822,547 | A | 6/1906 | Nicolson |
| 2,646,023 | A | 7/1953 | Virgil |
| 2,729,078 | A | * | 1/1956 | Schmidt .......................... 464/47 |
| 2,801,137 | A | 7/1957 | Clay |
| 3,065,996 | A | 11/1962 | Patz |
| 3,067,914 | A | 12/1962 | Ellaby |
| 3,181,715 | A | 5/1965 | Olson |
| 3,204,786 | A | 9/1965 | Kucera |
| 3,228,514 | A | 1/1966 | Kucera |
| 3,229,665 | A | 1/1966 | Baltz |
| 3,231,106 | A | 1/1966 | Bruecker |
| 3,291,325 | A | 12/1966 | Henningson |

(Continued)

FOREIGN PATENT DOCUMENTS

| | | |
|---|---|---|
| FR | 1032110 | 6/1953 |
| FR | 2309442 | 11/1976 |
| FR | 2348132 | 11/1977 |

OTHER PUBLICATIONS

G & G Manufacturing SC-X 4 Ratchet Slip Clutches, Jun. 17, 2012, available at https://web.archive.org/web/20120617003451/http://www.ggmfg.com/Products/CouplersClutches/SCX4RatchetSlipClutches.aspx.*

*Primary Examiner* — Saul Rodriguez
*Assistant Examiner* — Mark Hageman
(74) *Attorney, Agent, or Firm* — Jeffrey A. Proehl; Woods, Fuller, Shultz & Smith, P.C.

(57) ABSTRACT

An elongated sweep apparatus for moving particulate matter in a bin may include a sweep assembly movable over the floor of the bin and a sweep drive assembly to move the sweep assembly. The sweep assembly may comprise a particulate sweep structure to move particulate matter toward one end of the elongated sweep apparatus. The sweep drive assembly may comprise at least one wheel to contact the floor and a slippage interface structure connected to the at least one wheel to transfer rotation to the at least one wheel and permit a degree of slippage of the rotational motion transferred to the at least one wheel when resistance to rotation of the at least one wheel exceeds a threshold resistance level.

6 Claims, 8 Drawing Sheets

(56) References Cited

U.S. PATENT DOCUMENTS

| | | | |
|---|---|---|---|
| 3,338,636 A | 8/1967 | Chapman | |
| 3,438,517 A | 4/1969 | Steffen | |
| 3,455,470 A | 7/1969 | Kanagy | |
| 3,472,357 A | 10/1969 | Strocker | |
| 3,647,094 A | 3/1972 | Jackson | |
| 3,746,137 A * | 7/1973 | Ruschke, Jr. | 192/48.5 |
| 3,828,916 A | 8/1974 | Patz | |
| 3,908,840 A | 9/1975 | Lambert | |
| 3,946,861 A | 3/1976 | Sandefur | |
| 3,974,908 A | 8/1976 | Keichinger | |
| 4,022,335 A | 5/1977 | Lambert | |
| 4,198,186 A * | 4/1980 | Holdren et al. | 414/308 |
| 4,236,627 A * | 12/1980 | Sigott et al. | 198/514 |
| 4,242,028 A | 12/1980 | Van Dusen | |
| 4,313,705 A | 2/1982 | Jackson | |
| 4,329,105 A | 5/1982 | Buschbom | |
| 4,516,898 A | 5/1985 | Cantenot | |
| 4,571,138 A * | 2/1986 | Farajun | 414/323 |
| 4,619,577 A | 10/1986 | Swanson | |
| 4,655,666 A | 4/1987 | Cantenot | |
| 4,669,941 A | 6/1987 | West | |
| 4,762,220 A | 8/1988 | Lutke | |
| 4,772,173 A * | 9/1988 | Buschbom et al. | 414/320 |
| 4,773,808 A | 9/1988 | Fischer | |
| 4,801,085 A * | 1/1989 | Fischer | 239/1 |
| 4,836,362 A * | 6/1989 | Bower | 198/810.01 |
| 4,875,820 A | 10/1989 | Lepp | |
| 4,998,855 A | 3/1991 | Tschernatsch | |
| 5,088,871 A | 2/1992 | Mellish | |
| 5,099,983 A * | 3/1992 | Valdez et al. | 198/507 |
| 5,186,596 A | 2/1993 | Boucher | |
| 5,639,200 A * | 6/1997 | Jiskoot | 414/310 |
| 5,769,590 A | 6/1998 | Weikel | |
| 6,039,647 A | 3/2000 | Weikel | |
| 6,254,329 B1 | 7/2001 | Sukup | |
| 6,280,331 B1 * | 8/2001 | Tuttlebee | 464/46 |
| 6,499,930 B1 | 12/2002 | Dixon | |
| 6,948,902 B2 | 9/2005 | Hanig | |
| 7,588,405 B2 | 9/2009 | Johnson | |
| 8,770,388 B1 | 7/2014 | Chaon | |
| 2004/0146381 A1 | 7/2004 | Hanson | |
| 2005/0263372 A1 * | 12/2005 | Hollander et al. | 198/550.1 |
| 2006/0245864 A1 | 11/2006 | Epp | |
| 2010/0239399 A1 | 9/2010 | Hoogestraat | |
| 2013/0064629 A1 | 3/2013 | Schuelke | |

\* cited by examiner

BIN SWEEP WITH DRIVE SLIPPAGE CAPABILITY

BACKGROUND

Field

The present disclosure relates to bin sweeps and more particularly pertains to a new bin sweep with drive slippage capability for adapting operation of the drive assembly of the bin sweep to varying bin contents conditions.

SUMMARY

The present disclosure relates to an elongated sweep apparatus for moving particulate matter in a bin. The apparatus may comprise a sweep assembly movable over the floor of the bin and a sweep drive assembly configured to move the sweep assembly. The sweep assembly may comprise a housing generally extending between the opposite ends of the sweep apparatus and a particulate sweep structure configured to move particulate matter toward one end of the elongated sweep apparatus. The sweep drive assembly may comprise at least one wheel to contact the bin floor and a slippage interface structure connected to the at least one wheel to transfer rotation to the at least one wheel and permit a degree of slippage of the rotational motion transferred to the at least one wheel when resistance to rotation of the at least one wheel exceeds a threshold resistance level. In some embodiments, the particulate sweep structure may supply rotational power to the sweep drive assembly.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 9 thereof, a new bin sweep with drive slippage capability embodying the principles and concepts of the disclosed subject matter will be described.

Bin sweeps often operate by pushing up against the side of a grain pile in the interior of the bin, so that the forward side of the bin sweep is brought into contact with the grain particles at the periphery of the pile. The pile may be several feet in height, which must be reduced before the sweep can further advance in the direction of the pile. A drive system mounted on the bin sweep typically maintains the forward side of the bin sweep, and the grain movement means, in contact with the particles on the side of the pile by forcing the bin sweep to move toward and against the pile. However, the rate at which the bin sweep is able to advance or move is dependent upon the height of the pile, and the taller the pile height the longer it takes to diminish the pile height enough to permit the bin sweep to move forward. Since the rate at which the bin sweep is able to advance varies, slippage of the wheels of the drive system on the floor may permit the pressure of the bin sweep against the pile to be maintained while still accommodating the variable rate at which the pile height diminishes.

Applicants have discovered that the slippage of the wheels on the floor may not be sufficient to allow the bin sweep to remain relatively stationary while the grain particles are carried inward and the pile diminished, and have recognized that the grip provided by the wheels can impose a significant stress on the drive system, and more specifically the gears of the drive system, and in some cases tends to prematurely wear or even fracture the gears of the drive train leading to a breakdown. Specifically, the gears of the drive system may tend to be damaged when the wheels of the drive system do not slip on the floor to a degree sufficient to absorb the difference between the rate of travel at which the drive system is operating and the actual rate of travel of the bin sweep across the bin floor.

Also, in bin sweep systems that utilize the same source of rotational power to operate both the grain movement means and the drive system, the problem may not be effectively solved by simply decreasing the speed of the drive system as this also decreases the speed of the grain movement means, which slows the pace at which the particulate matter is removed from the bin. However, utilizing separate power sources for the grain movement means and the drive system compromises the economy and reliability provided by the use of a common power source.

Applicants have discovered that incorporating a slippage interface in the drive assembly of a bin sweep can provide a degree of slippage in the drive line that can provide the slippage needed so that the wheels are not rotated when resistance to the rotation of the wheels reaches a level that might damage the gears in the drive system.

Figure 9:
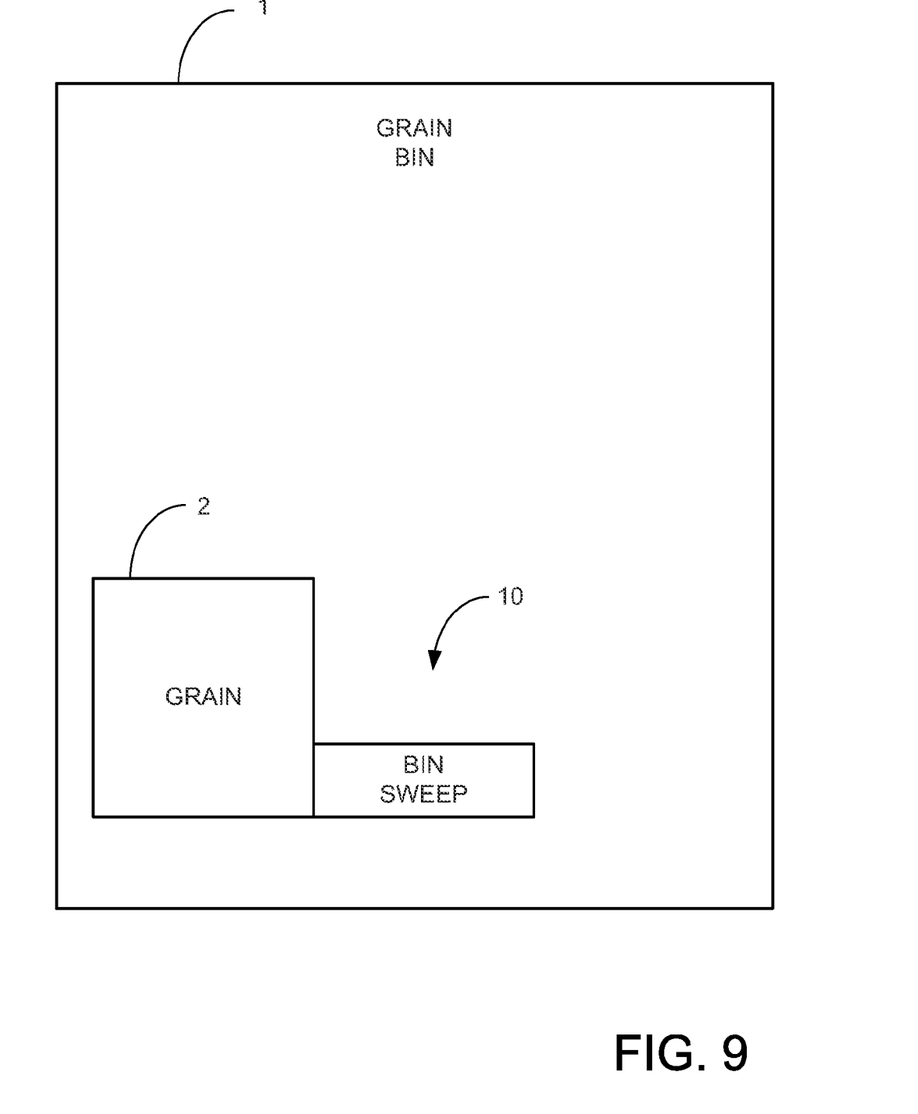
FIG. 9 is a schematic diagram of the system in an illustrative storage bin environment used to store grain.

In one aspect, the disclosure is directed to a bin sweep system 10 for moving particulate matter in a storage bin holding the particulate matter. Suitably, although not critically, the particulate matter may be grain 2 and the bin may be a grain bin 1. The bin may have a floor on which the particulate matter rests, and the floor may have a sump located toward the center of the floor of the bin into which the grain is moved so that the grain may be moved out of the bin. In some embodiments, the sump may feed into the auger of a conveyor that is positioned below the floor and leads to a location outside the bin, although this is not critical.

Figure 1:
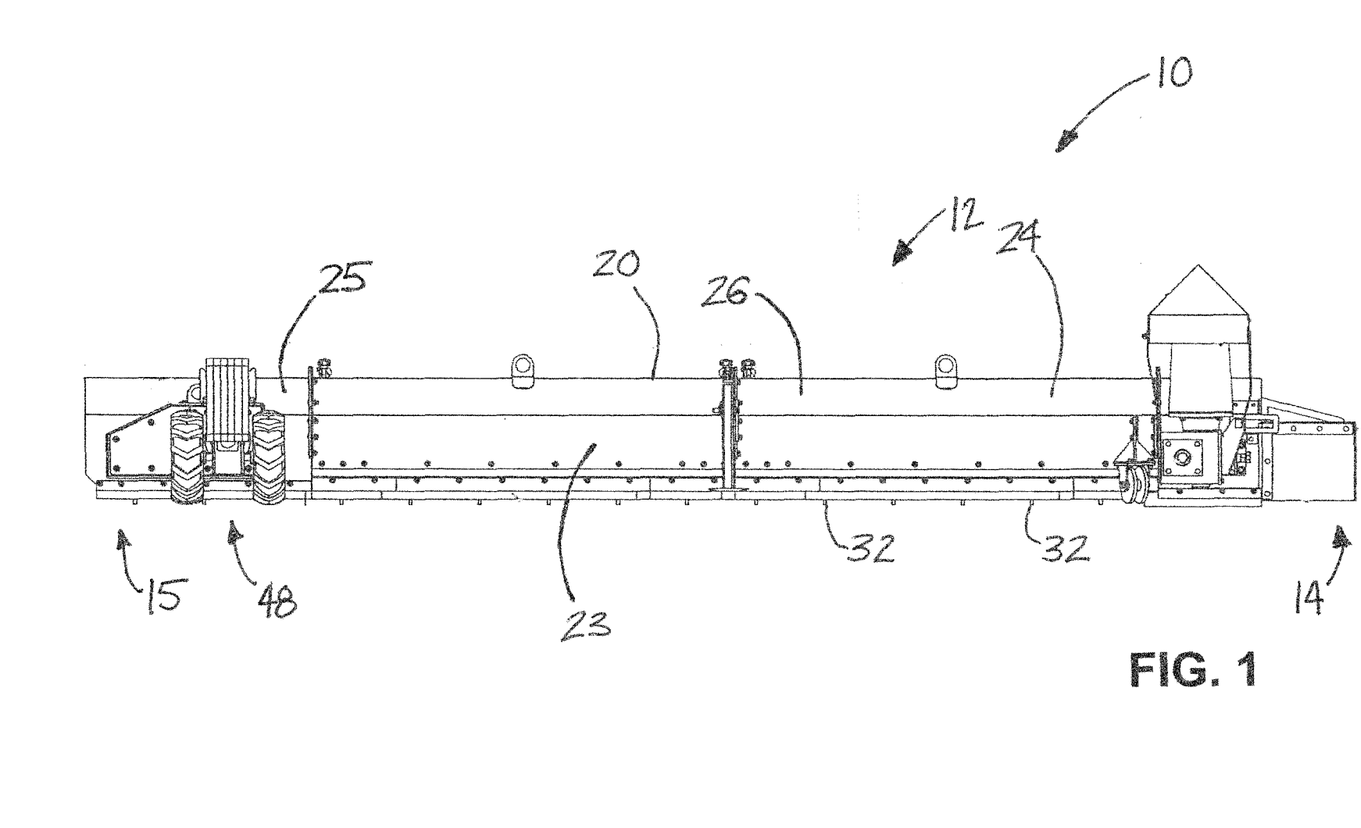
FIG. 1 is a schematic side view of a sweep apparatus suitable for usage of aspects of the disclosure.
Figure 2:
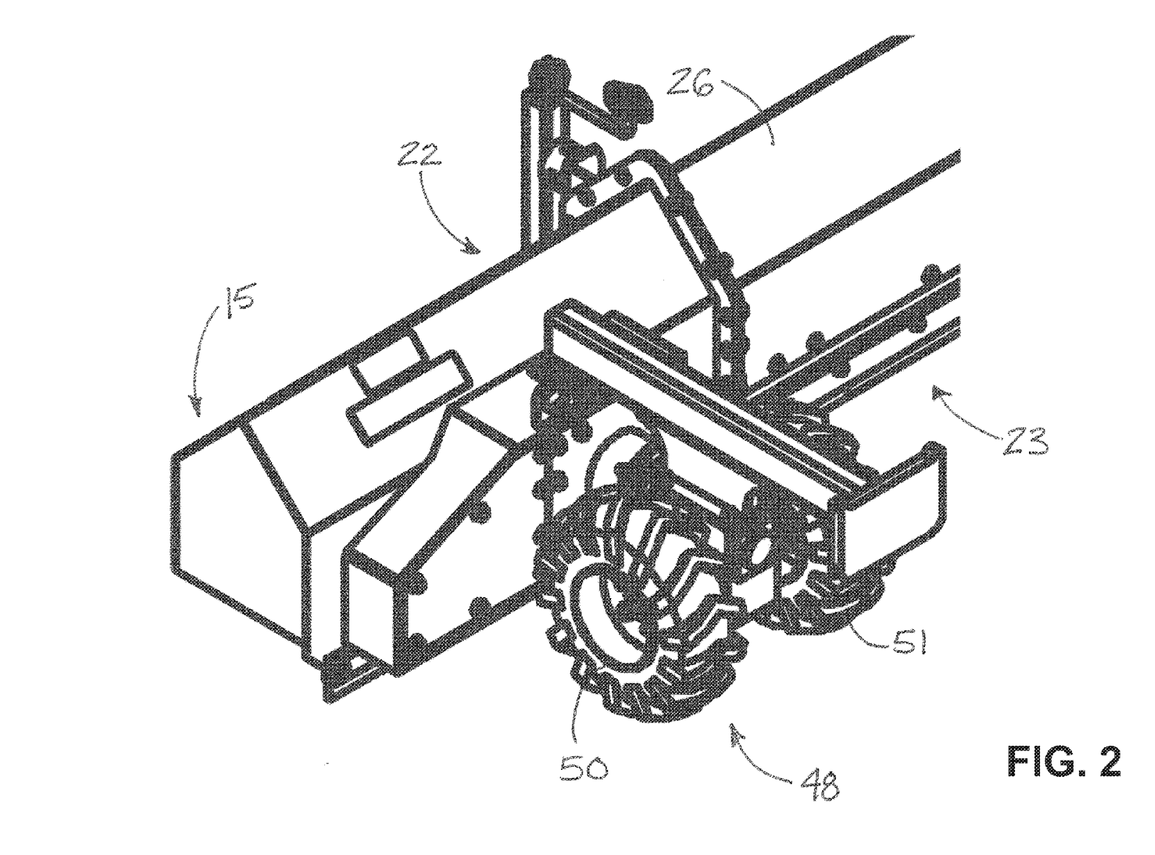
FIG. 2 is a schematic perspective view of a portion of an illustrative bin sweep apparatus with a drive assembly employing the new drive slippage capability according to the present disclosure.
Figure 3:
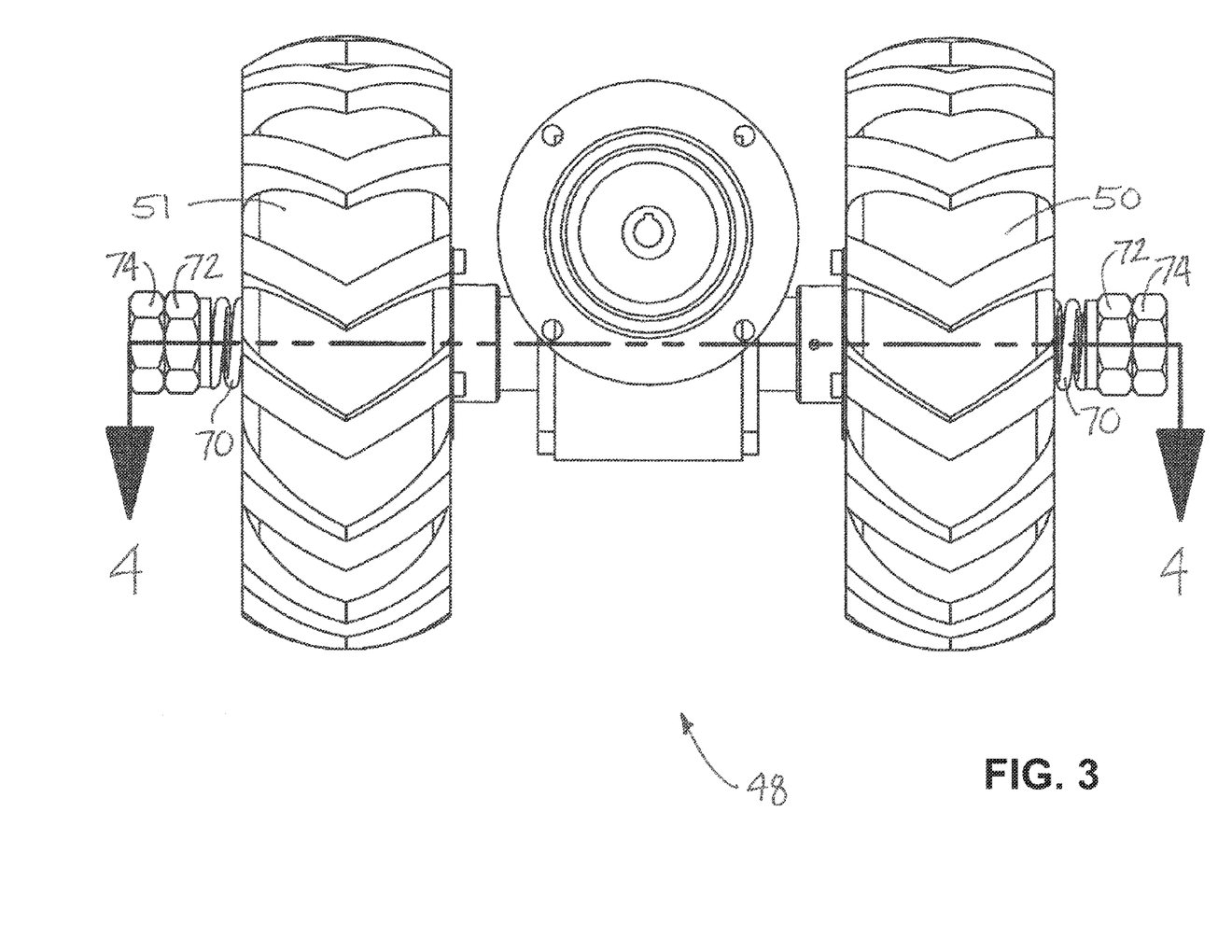
FIG. 3 is a schematic view looking rearwardly onto a portion of the sweep drive assembly isolated from the remainder of the sweep apparatus, according to an illustrative embodiment.
Figure 4:
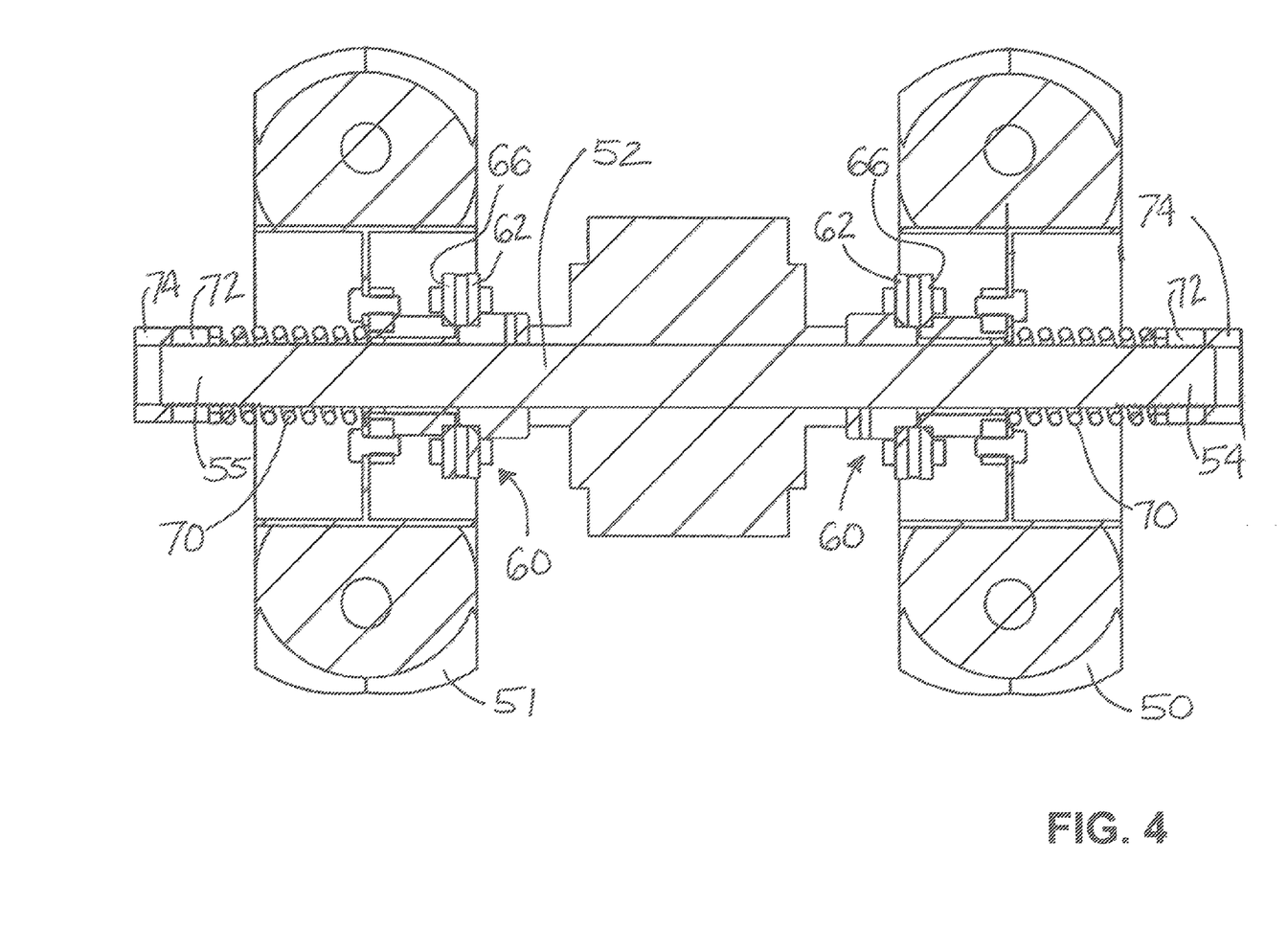
FIG. 4 is a schematic sectional view of the sweep drive assembly taken along line 4-4 of FIG. 3.
Figure 5:
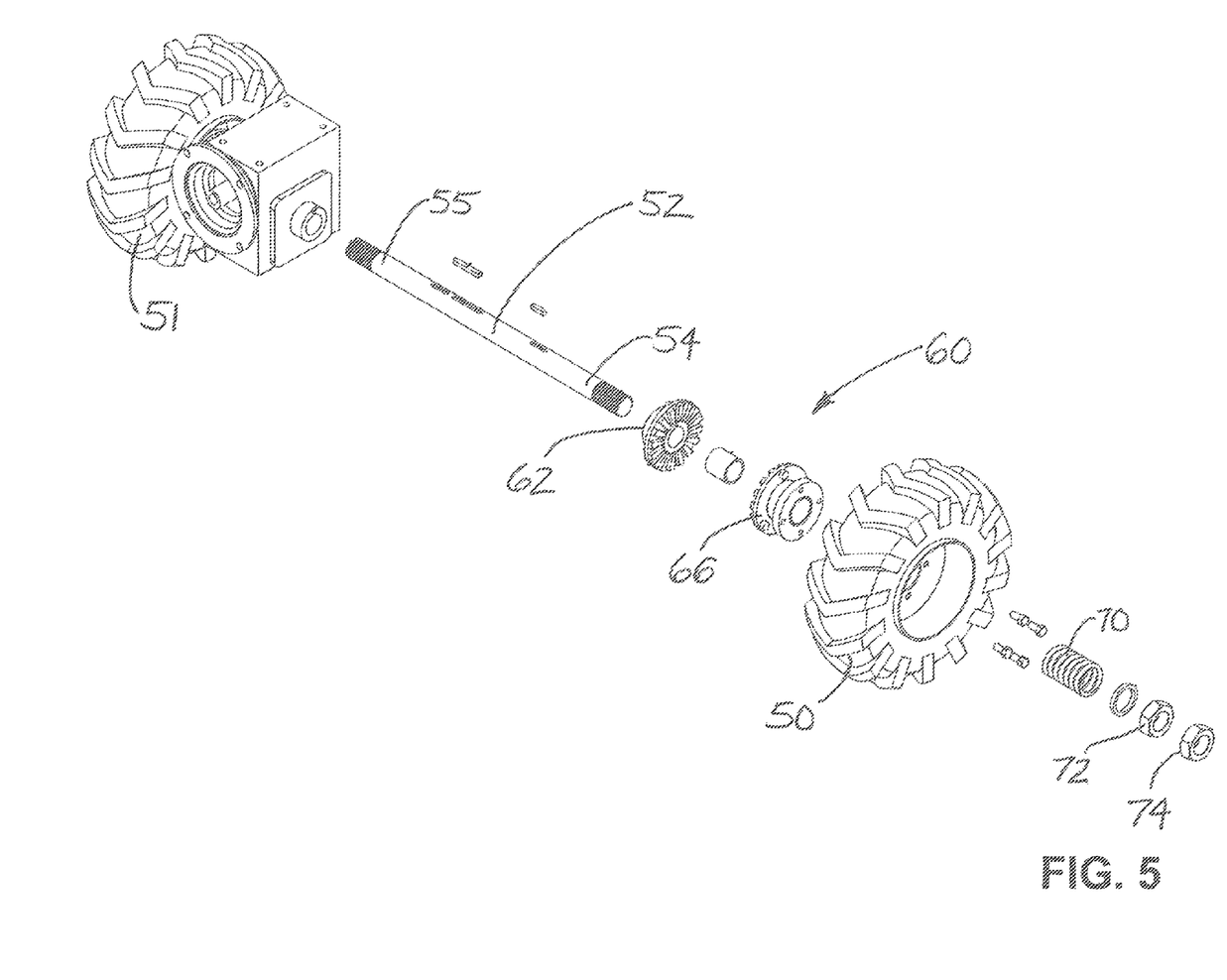
FIG. 5 is a schematic exploded perspective view of the sweep drive assembly having the drive slippage capability.
Figure 6:
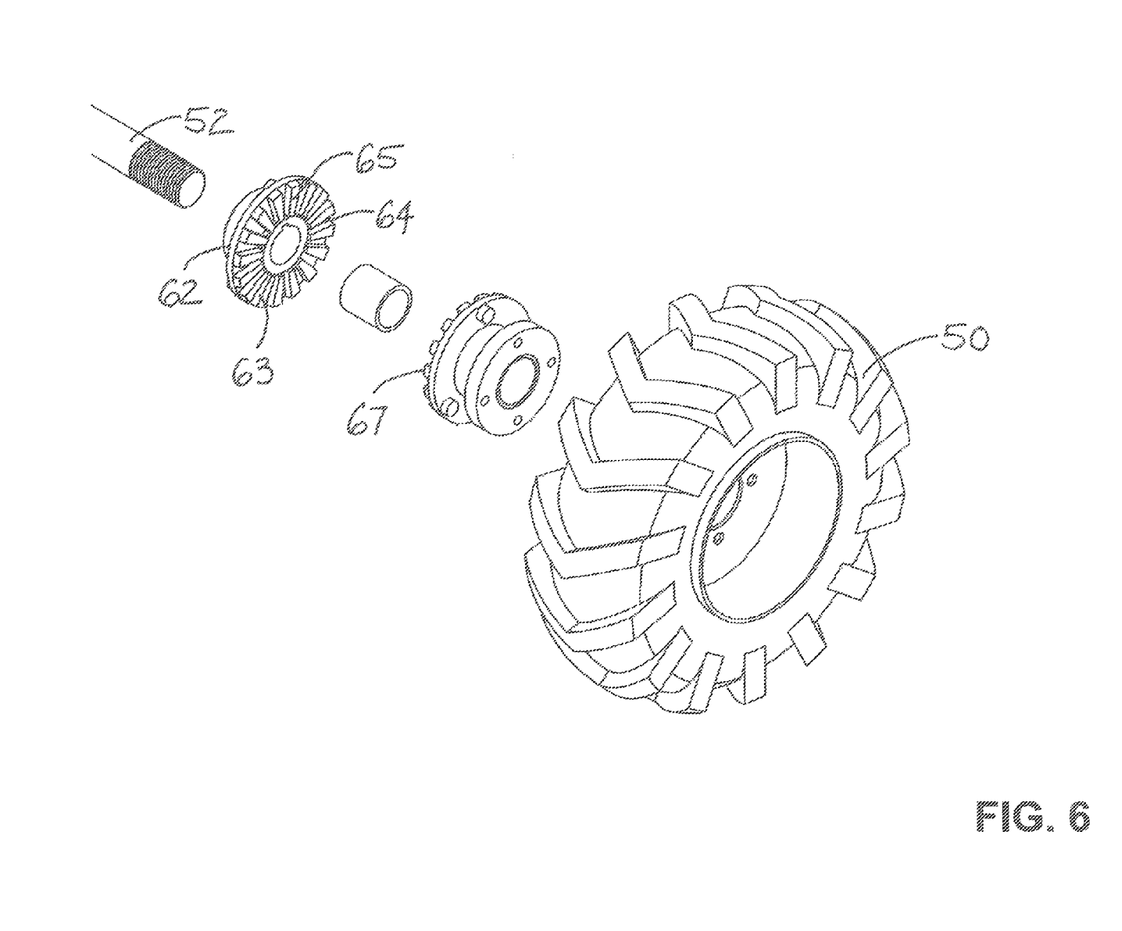
FIG. 6 is a schematic exploded perspective view of a portion of the sweep drive assembly.
Figure 7:
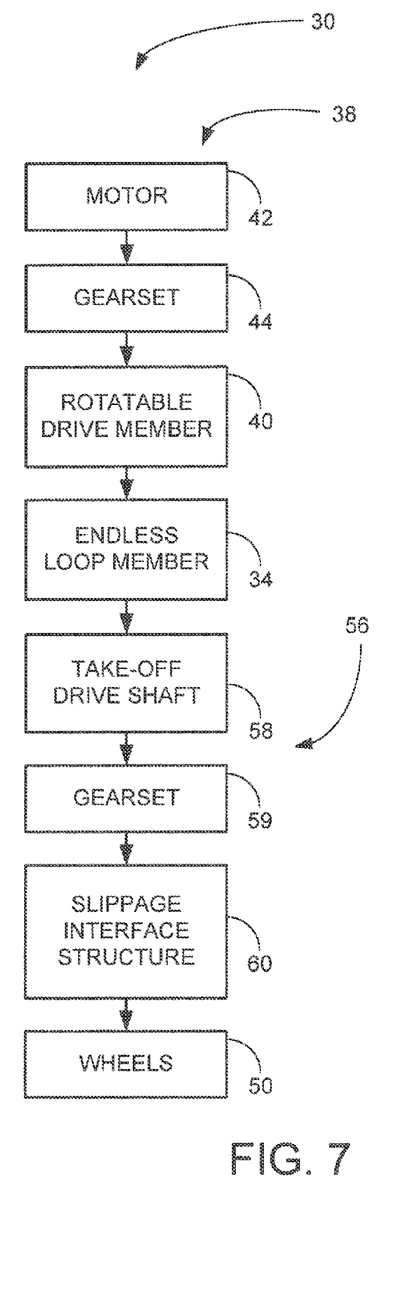
FIG. 7 is a schematic diagram of elements of the sweep drive assembly.
Figure 8:
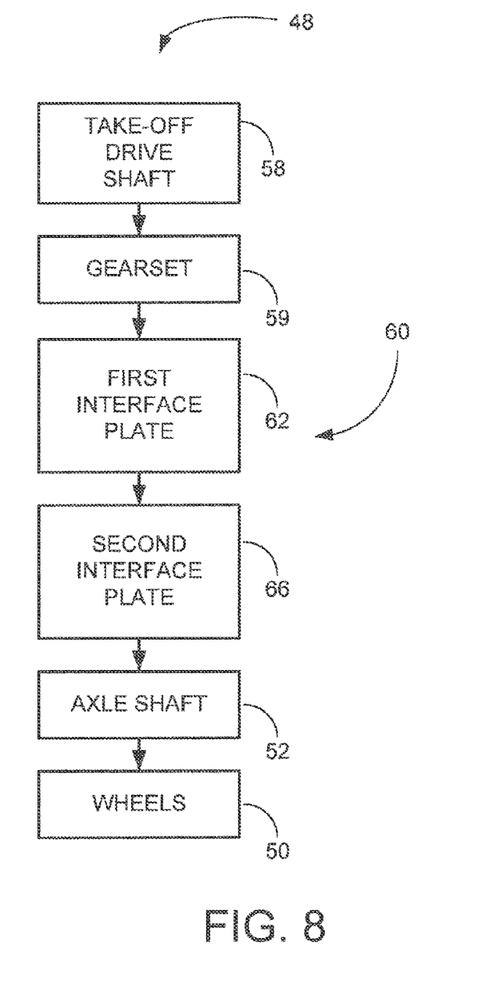
FIG. 8 is a schematic diagram of elements of the sweep drive assembly in greater detail, including elements of the slippage interface structure.

The bin sweep system 10 may comprise an elongated sweep apparatus 12 with opposite ends, such as an inboard end 14 for locating toward to a central area of the bin and an outboard end 15 for locating toward a peripheral area of the bin, such as an outer wall of the bin. The sweep apparatus 10 may include a sweep assembly 20 that is movable over the floor of the bin to move particulate and a sweep drive assembly 48 configured to move the sweep assembly across a floor. The sweep assembly 20 has a forward side 22 that is generally oriented toward a direction of movement of the sweep apparatus, and toward a pile of particulate matter to be moved, and a rearward side 23 that is oriented away from the direction of movement and away from the pile of particles. The sweep assembly 20 may also comprise at least two units 24, 25 such that units may be added or omitted to adjust the length of the sweep assembly between the inboard 14 and outboard 15 ends of the sweep apparatus. The units may be arranged in a substantially linear array between the inboard 14 and outboard 15 ends of the sweep apparatus to extend from the sump of the bin toward the outer peripheral area of the bin, and may be removably connected together to permit reconfiguration of the units if desired.

The sweep assembly 20 may include a housing 26 that generally extends between the opposite ends 14, 15 of the sweep apparatus, and may be comprised of a plurality of segments that generally correspond to the units if utilized. In some of the most preferred embodiments, the housing may have an upper surface that is sloped, and may be sloped toward the forward side 22 and the rearward side 23 from a longitudinally extending peak.

The sweep assembly 20 may further include a particulate sweep structure 30 that is configured to move particulate matter on the floor beneath the sweep apparatus toward one end of the elongated sweep apparatus, typically toward the inboard end 14 and the sump in the bin floor. The particulate sweep structure 30 may include a plurality of interconnected paddles 32 movable in a succession on a path along at least a portion of the length of the sweep apparatus 12 between the inboard 14 and outboard 15 ends. The plurality of paddles 32 may be arrayed along a line extending generally between the inboard and outboard ends of the sweep apparatus, and may be mounted on an endless loop member 34 at spaced locations along the endless loop. The endless loop member may comprise a series of interconnected links, such as a plurality of chain links.

The particulate sweep structure 30 may also comprise a paddle movement assembly 38 configured to move the plurality of paddles 32 along the sweep assembly. The paddle movement assembly 38 may be located in a unit positioned toward the inboard end 14 of the sweep apparatus. Illustratively, the paddle movement assembly 38 may include a rotatable drive member 40 on which a portion of the interconnected paddles and the endless loop member 34 is entrained, and in some embodiments the rotatable drive member is a sprocket. The paddle movement assembly 38 may further include a motor 42 connected to the rotatable drive member to rotate the member, and a gearset 44 may connect the motor to the rotatable drive member to transfer rotational motion from the motor to the rotatable drive member. In other embodiments, rather than utilizing a motor on the sweep apparatus 10 to power the apparatus, rotational power for the apparatus may be drawn from a gearbox positioned adjacent to the bin floor and usually toward the center of the bin.

The sweep drive assembly 48 may be mounted on one of the units of the sweep assembly, and may be located toward the outboard end 15 of the elongated sweep apparatus. Further, the drive assembly may be generally positioned on the rearward side 23 of the sweep assembly 20 such that the drive assembly pushes the sweep assembly toward the pile of grain. In some of the most preferred embodiments, the sweep drive assembly is powered or driven by movement of the particulate sweep structure, which in turn is powered by the paddle movement assembly 38. The drive assembly 48 may comprise at least one wheel 50 that is configured to contact the floor, and in some of the most preferred embodiments includes a pair of wheels 50, 51. The drive assembly may comprise an axle shaft 52 that is configured to be rotated by the particulate sweep structure such that movement of the sweep structure along the path rotates the axle. The axle 52 has opposite end regions 54, 55, and the opposite end regions may be threaded. The axle shaft 52 may extend through the wheel 50 or wheels 50, 51.

The drive assembly 48 may further comprise a power transfer assembly 56 that is configured to transfer power from the particulate sweep structure 30 to the axle shaft 52 for driving the wheels. The power transfer assembly 56 may comprise a take off drive shaft 58 that is in rotational communication with the particulate sweep structure such that movement of the particulate sweep structure along the path rotates the take-off drive shaft. The takeoff drive shaft may have a sprocket mounted thereon to engage the endless loop member 34 of the particulate sweep structure so that movement of the sweep structure rotates the sprocket and drive shaft 58. The power transfer assembly 56 may also comprise a power transfer gearset 59 that connects the take-off drive shaft and the axle shaft and transfers rotational motion between the take-off drive shaft and the axle shaft.

A significant aspect of the sweep drive assembly 48 is a slippage interface structure 60 connected to the wheel or wheels 50, 51 and the axle shaft 52 to transfer rotation from the axle shaft to the wheels while permitting a degree of slippage of the rotational motion transferred between the axle and the at least one wheel when resistance to rotation of the wheels exceeds a threshold resistance level. The slippage interface structure 60 thus will rotate the wheels without slippage as long as the wheels are not subjected to rotation resistance that exceeds the threshold resistance level, such as when the sweep assembly 20 is held stationary by contact with the grain pile and the wheels are rotating but the grip of the wheels in contact with the bin does not allow the wheels to slip (or slip completely) on the floor surface. Where resistance to movement of the sweep assembly and the rotation of the wheels requires slippage, and slippage between the wheels and the bin floor does not occur, the components of the sweep drive assembly will be adversely affected without the operation of the slippage interface structure 60.

In some embodiments of the sweep apparatus 12, the slippage interface structure includes a first interface plate 62 and a second interface plate 66 that are in contact with each other and transfer rotational power below the threshold resistance level, but may slip with respect to each other above the threshold resistance level such that one plate does not rotate at the same speed as the other. In the illustrative embodiments, the first interface plate 62 is the driver plate and is connected to the axle in a manner so that the plate 62 rotates with the axle as a unit, and the second interface plate is the driven plate and is connected to one of the wheels in a manner so that the plate 66 rotates with the wheel as a unit. Approximately at or below the threshold resistance level, the plates 62, 66 tend to rotate together without slippage therebetween and rotation of the axle is transferred to the wheel. When slippage between the interface plates 62, 66 occurs, then the rotation of the first plate is not completely and entirely transferred to the second plate, and the rotation of the axle is not completely transferred to the wheel.

To provide the incomplete resistance to slippage between the plates 62, 66, the first interface plate 62 may have a first interface surface 63 and the second interface plate 66 may have a second interface surface 67 that is positioned in adjacent opposition to the first interface surface, and the surfaces 63, 67 are in contact with each other. The first interface surface 63 and the second interface surface 67 may each have a roughened character that tends to increase the friction between the plates to a degree that the plates will rotate together at or below the threshold resistance level, but not to a degree where slippage cannot occur above the threshold resistance. To accomplish this, in some embodiments the first interface surface 63 may have a plurality of alternating radial grooves 64 and ridges 65 and the second interface surface 67 may have a plurality of alternating radial grooves 64 and ridges 65. The first and second interface plates 62, 66 may be annular in shape with the axle extending through the central hole in each of the plates 62, 66.

The slippage interface structure 60 may further include a biasing member 70 that is configured to bias the first 62 and second 66 interface plates toward each other such that the first 63 and second 67 interface surfaces are pressed against each other to enhance the engagement (such as by friction or mechanical interlock) between the surfaces, and thus to enhance the transfer of rotation. In some embodiments, the biasing member 70 may comprise a spring configured to press the second interface plate 66 and interface surface 67 against the first interface plate 62 and interface surface 63. The spring may be a helical compression spring and the axle shaft 52 may extend through the center of the spring. The spring may be positioned between the second interface plate 66 and a stop nut 72 that is mounted on the axle shaft. A second nut 74 may be used the help lock the position of the stop nut in position. The position of the stop nut 72 may be adjusted by advancing the nut on the threads on the axle shaft to provide an adjustable degree of compression of the spring, thus increasing or decreasing the pressure applied to the second interface plate and thereby influencing and adjusting the magnitude of the threshold resistance level.

As can be seen in the figures, embodiments of the sweep drive assembly that utilize a pair of wheels may also utilize a pair of slippage interface structures, with each interface structure being associated with one of the wheels.

The foregoing description of an implementation of elements of the disclosure on a bin sweep utilizing paddles is merely illustrative and aspects of the disclosure may be suitable for use with other bin sweep technologies including, for example, auger-based sweeps.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. An elongated sweep apparatus for moving particulate matter in a bin comprising:

a sweep assembly movable over the floor of the bin, the sweep assembly comprising a housing generally extending between opposite ends of the sweep apparatus and a particulate sweep structure configured to move particulate matter toward one end of the elongated sweep apparatus, the particulate sweep structure including a plurality of interconnected paddles movable in a succession on a path along at least a portion of the sweep assembly between the opposite ends;

a sweep drive assembly driven by movement of the particulate sweep structure and configured to move the sweep assembly, the sweep drive assembly comprising a pair of wheels to contact the bin floor, the drive assembly being connected to the particulate sweep structure in a manner such that movement of the plurality of interconnected paddles of the sweep structure operates the drive assembly to rotate the wheels; and a slippage interface structure connected to the wheels and the sweep structure and configured to permit a degree of slippage between movement of the interconnected paddles of the sweep structure and rotation of the wheels when resistance to rotation of the wheels exceeds a threshold resistance level;

wherein rotational motion is transferred to each of the wheels by separate said slippage interface structures to permit different degrees of slippage by each of the wheels being driven by the particulate sweep structure.

2. The apparatus of claim 1 wherein a said slippage interface structure comprises:

a first interface plate mounted on an axle to rotate with the interconnected paddles the first interface plate having a first interface surface; and a second interface plate mounted on the wheel to rotate with one of the wheels, the second interface plate having a second interface surface, the second interface surface being positioned in adjacent opposition to the first interface surface;

wherein at least one of the interface surfaces has a plurality of alternating radial grooves and ridges.

3. The apparatus of claim 2 wherein the slippage interface structure further comprises:

a biasing member biasing the first and second interface plates toward each other such that the first and second interface surfaces are pressed against each other.

4. The apparatus of claim 3 wherein the biasing member comprises a spring configured to press the second interface plate against the first interface plate.

5. The apparatus of claim 2 wherein each of the interface surfaces has a plurality of alternating radial grooves and ridges for selectively interlocking together.

6. The apparatus of claim 1 wherein the threshold resistance level is adjustable.

* * * * *